Aug. 24, 1965　　　　H. C. LANNEN　　　　3,202,304
CAMPER SUPPORT

Filed Feb. 24, 1964　　　　　　　　　　4 Sheets-Sheet 1

INVENTOR.
HUGH C. LANNEN

BY *Wells & St.John*

ATTYS.

INVENTOR.
HUGH C. LANNEN
BY
ATTYS.

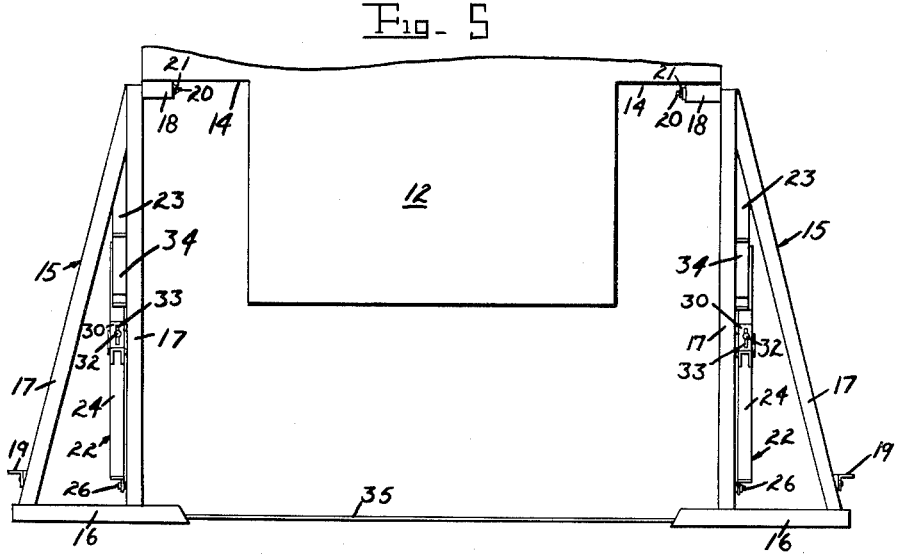
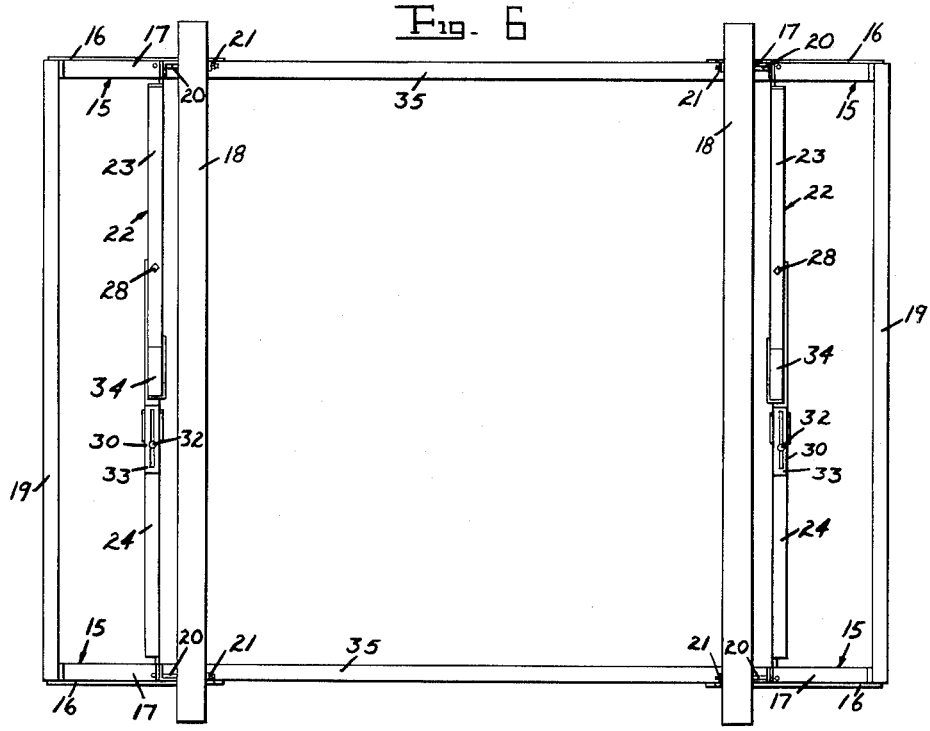

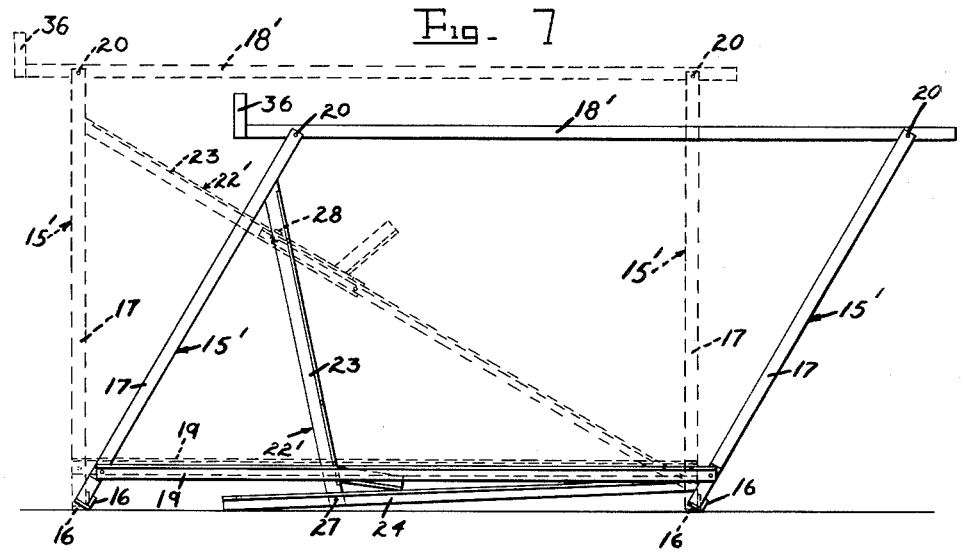
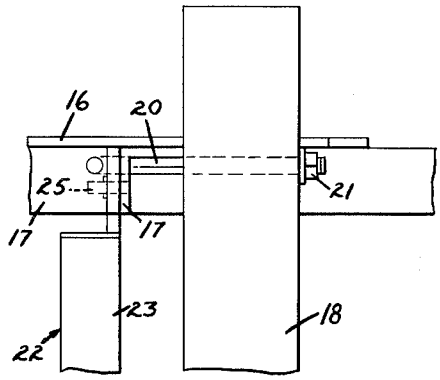
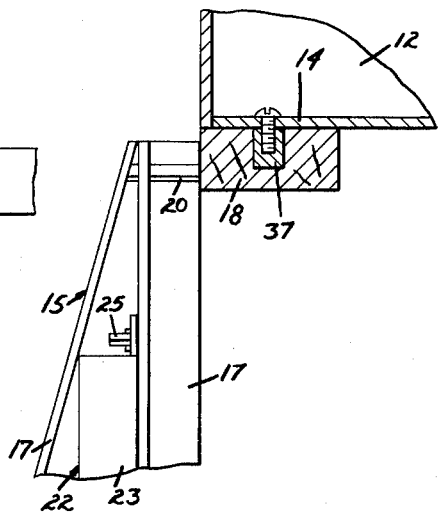

United States Patent Office 3,202,304
Patented Aug. 24, 1965

3,202,304
CAMPER SUPPORT
Hugh C. Lannen, East 4236 Hartson, Spokane, Wash.
Filed Feb. 24, 1964, Ser. No. 346,962
6 Claims. (Cl. 214—38)

This invention relates to a novel support for campers of the type used commonly at the back end of pickup trucks to provide sleeping and cooking quarters for mobile use.

The widespread use of campers on the beds of pickup trucks has made additional uses for the truck available to the owner thereof. Persons owning pickup trucks can now easily convert the truck to a mobile camping unit for sleeping and eating. The camper is very versatile and is more easily managed than a conventional trailer. However, it is advisable and desirable that the camper be removable from the truck so that the truck can be used for normal business or farm purposes, and also so that the truck can be used at camping sites for travel purposes, leaving the camper at the campsite for normal use. The present invention provides a simple support to carry the load of the camper when it is not mounted on the truck, and operable to elevate or lower the camper relative to the truck bed as this might be desired for loading or unloading purposes.

The first object of this invention is to provide a camper support that also serves to elevate or lower the camper relative to the truck bed due to the normal motion of the truck itself. No jacks or exterior mechanisms are required to effect such movement of the camper.

Another object of this invention is to provide a relatively light and mechanically simple support apparatus that can be manipulated by a single driver in the truck with no exterior manipulation required during the lifting or elevating of a camper.

Another object of this invention is to provide such a support that will be universally acceptable to all types of camper bodies without requiring particular adjustment or special skill on part of those using the support.

These and further objects will be evident from the following disclosure taken together with the accompanying drawings, which illustrate a preferred form of the embodiment plus two modifications that might be incorporated in the basic structure. It is to be understood that the form of the structure illustrated in the drawings is only exemplary, and is not intended to restrict the scope of the invention, which is defined in the detailed claims that follow this disclosure.

In the drawings:

FIGURE 5 is an end view of a pair of supports as they would be seen from the right in FIGURE 3, the lower section of a camper being shown in its supported position;

FIGURE 6 is a top view of a pair of camper supports as seen in FIGURE 5 with no camper structure shown on them;

FIGURE 7 is an elevation view of a second embodiment of the support, the elevated position of this embodiment being shown in dashed lines;

FIGURE 8 is a fragmentary top view of the upper corner of a single support as seen generally along line 8—8 in FIGURE 3, and FIGURE 9 is a fragmentary sectional view taken along a vertical line through the upper supporting member, showing a third embodiment of the invention as it would be utilized to carry a modified wall of a camper.

Figure 1:
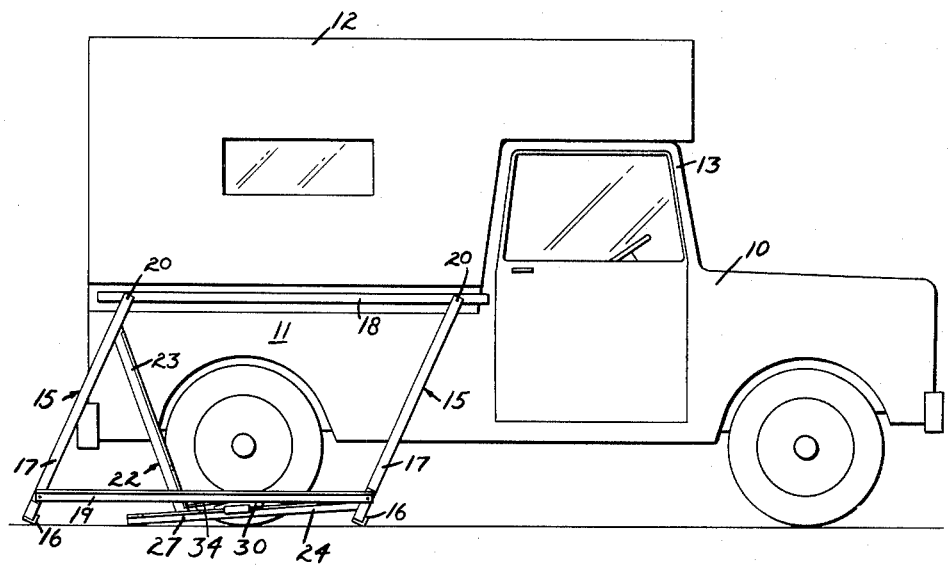
FIGURE 1 is an elevation view of a truck and camper showing the position of the support prior to engagement with the camper body.
Figure 2:
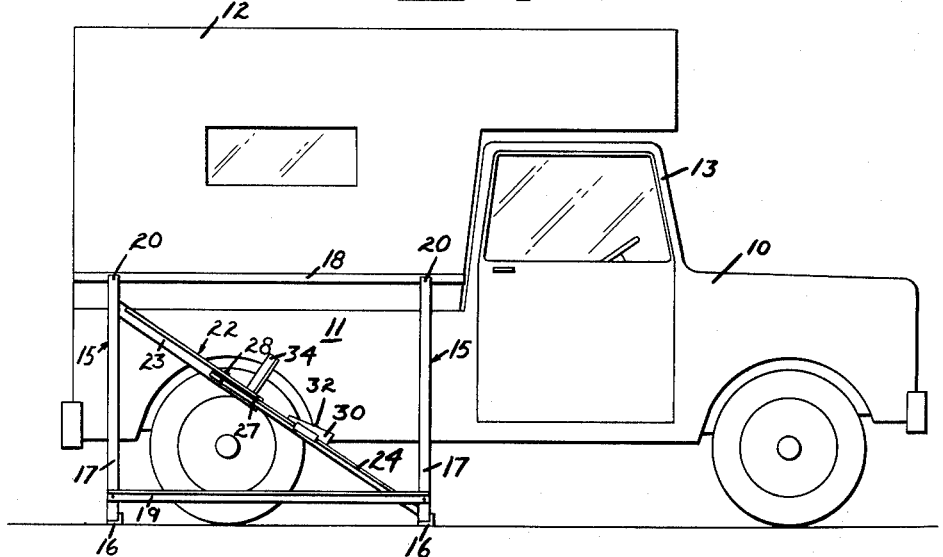
FIGURE 2 is a view similar to FIGURE 1 showing the camper in an elevated position and carried by the support.
Figure 3:
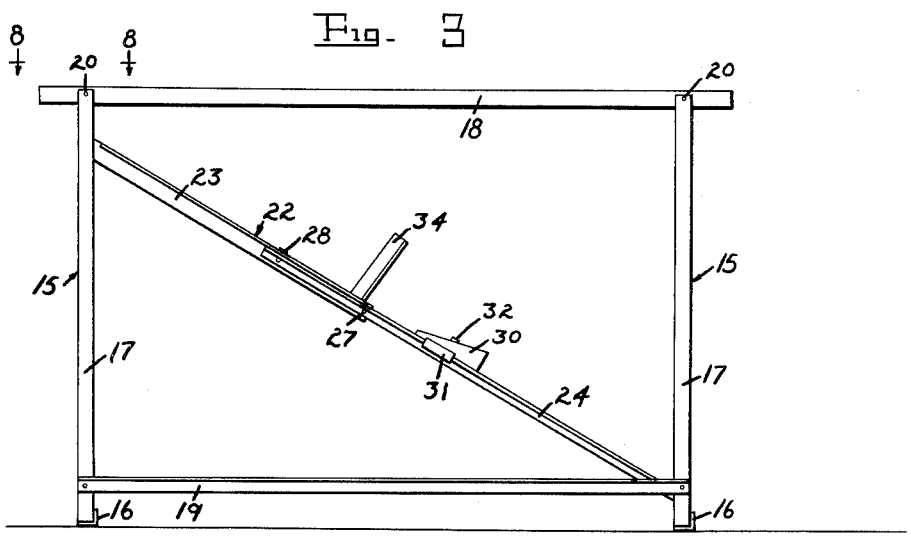
FIGURE 3 is an enlarged elevation view of the support in its fully elevated position.

Referring now to the drawings, and particularly to FIGURES 1 through 6 and FIGURE 8, the first form of this invention is adapted to frictionally engage a camper surface and to elevate the camper or lower it depending upon the motion of the truck that selectively carries the camper as a mobile arrangement. A typical truck 10 is shown in FIGURES 1 and 2, and is normally a pickup truck having a rear bed with sides 11 of conventional height. Mounted on the bed of the truck is a camper 12 that rests on the sides 11 and overhangs the cab 13 of the truck in a conventional fashion. The structure of such campers 12 varies considerably according to the particular manufacturer involved, but all such campers include outwardly protruding ledges 14 that can best be seen in FIGURE 5. These ledges 14 protrude outwardly above the sides 11 of the truck bed. The bottom of the camper supports the camper within the truck bed. The present invention is adapted to lift the camper 12 by engagement of the ledges 14 which are spaced from sides 11.

The support constructed according to this invention comprises a pair of parallel triangular support members 15 having enlarged bases 16 and rigid upright members 17 that converge at the top to form a stable triangular configuration. The two upright members 15 are respectively pivoted on upper horizontal connecting member 18 by means of bolts 20 welded or otherwise secured to the upper apex of the inner members 17 (FIGURE 8). The bolts are pivotally received within apertures in the horizontal member 18, which is held in place by means of threaded nuts 21. The horizontal member 18 might well be a wooden board, so as to be replaceable as might be desired. A pivoted lower connecting member 19 connected between members 15 completes each parallelogram unit.

The two upright members 15 are joined by a diagonal member 22 comprised of an upper section 23 and a lower section 24. The upper section 23 is pivotally connected to the inside upright element 17 of the rear upright member 15 by means of a pivot connection shown in FIGURE 8 and designated as 25. The lower section 24 is pivotally connected to the inner upright element 17 of the front member 15 by a pivot connection designated by the numeral 26 (see FIGURE 5). The two sections 23 and 24 overlap one another and are pivotally connected to each other about a pivot shown in FIGURES 3 and 4 and designated by the numeral 27. The sections 23 and 24 are pivoted relative to one another so as to move between the angular position shown in FIGURE 4 and a straight aligned position shown in FIGURE 3, wherein sections 23 and 24 can be locked relative to one another by means of a bolt assembly 28 so as to maintain the member 22 in the aligned diagonal position.

All of the portions of the upright members 15 and the diagonal member 22 can be made of conventional angle iron construction, with appropriate relief of the flanges of the angle iron in order to provide the pivoting required and shown in the drawings. Other equivalent structures could be substituted, but the angle iron assembly as shown in the drawings has been found to be satisfactory in actual use.

With the first embodiment of the invention shown in FIGURES 1 through 6, reliance is made upon frictional engagement of the horizontal member 18 with the bottom surface of the ledge 14 in order to provide the necessary movement of the member 18 to lift the camper 12 as shown in FIGURE 2. In order to supply this frictional engagement without requiring manipulation by a person outside the truck during movement of the truck, initial engagement of the member 18 is afforded by means of a wedge 30 that is slidably mounted on the lower section 24 of the diagonal member 22. The movement of the wedge 30 is restricted by side guards 31 that respectively slide along the two sides of the section 24 and limit the movement of wedge 30 to a longitudinal direction relative to the section 24. Other movement of the wedge 30 is restricted by a loose bolt 32 that slides within a slot 33 formed along the top surface of the wedge 30 (FIGURE 6).

Figure 4:
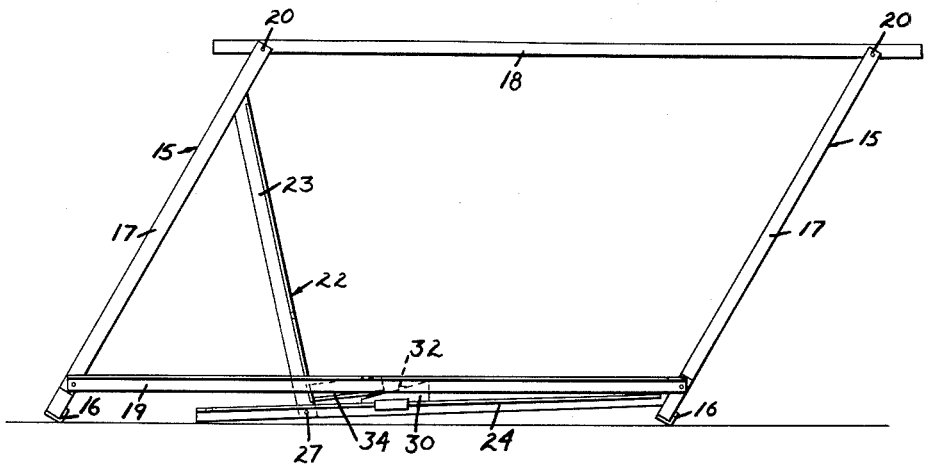
FIGURE 4 is a view similar to FIGURE 3 showing the support in its fully retracted position.

The length of the section 24 and the separation between the lower pivot 26 and the intermediate pivot 27 is such that the horizontal member 18 will normally rest just slightly below the ledge 14 when the section 24 rests upon the supporting ground surface that engages the base members 16 of the upright members 15 in a manner shown in FIGURE 1. There is provided on the upper section 23 of the diagonal member 22 an upwardly protruding section of angle iron 34 angularly situated so as to be frictionally contacted by the angular upper surface of the wedge 30 when the member 18 is in its lower position. The member 34 provides a rigid connection with the upper section 23 of the diagonal member 22, so that forcing of the wedge 30 to the left as seen in FIGURES 1 and 4 will cause the wedge 30 to effect raising of the horizontal member 18 into initial engagement with the bottom surface of the ledge 14 on camper 12. The frictional contact between member 34 and the upper surface of wedge 30 will maintain this position after it has been achieved, so that frictional engagement of the ledge 14 by member 18 is assured after initial manipulation of the wedge 30.

It is believed that the operation of the support is obvious from the foregoing description and the accompanying drawings. In order to remove the camper 12 from a truck 10, a support is placed at each side of the camper in a manner shown in FIGURE 5. It has been found advisable, in order to eliminate possible movement of the two supports from one another in a transverse direction, to tie the bases 18 of the two supports by means of laterally extending straps 35. The straps 35 could be detachable so as to be engageable under the truck body 10, or might be permanently attached to the supports and the truck 10 would then be driven over the straps 35. The supports could be utilized without the straps 35, but additional precaution would then be necessary in order to prevent accidental displacement of the supports during the lifting operation.

After placement of the supports at each side of the truck 10 directly under the ledge 14 of camper 12, one must utilize the two wedges 30 on the respective supports to frictionally engage the member 18 against the ledge 14. After this initial engagement has been achieved, one need only to back the truck 10 in a rearward fashion to thereby raise the two supports to the position shown in FIGURE 2. A single person can place these supports in their intended positions, adjust the wedges 30, and then drive the truck to the location shown in FIGURE 2, without any help from another. The bolt assembly 28 is then locked in place to maintain the diagonal member 22 in its aligned position, after which the truck 10 can be driven out from under the camper 12 and the two supports themselves will serve as a stationary foundation for the camper 12. The supports can be used for storage of the camper 12 during off-season use of the truck 10 or for temporary supports during use of the truck 10 at a campsite.

In order to place the camper 12 on the truck 10 from its elevated position as seen in FIGURE 2, a reverse of the foregoing procedure is required. After initial lifting of the camper 12, the wedges 30 will slide freely down the lower section 24 of the diagonal member 22 and will not retard lowering of the camper 12. One must then drive the truck 10 under the camper 12 so that the rear of the truck cab 13 abuts the adjacent walls of camper 12. The bolt assemblies 28 are then released, and the camper 12 will follow the truck 10 in a forward direction when the truck is driven to the right as seen in FIGURE 2. The diagonal member 22 will automatically collapse and attain the position shown in FIGURE 1 where the lower section 24 rests upon the supporting ground surface.

The two supports can be made to fold to a more compact position for carrying purposes, if this is desired. This can be achieved by disconnecting the various elements at their pivot locations, so that the supports can be carried at the sides or on the top of the camper 12 to a remote location.

In FIGURE 7 is found a somewhat modified version of the support. In this instance, a protruding member 36 is fastened to the rear end of the horizontal member 18' carried by upright members 15' and a diagonal member 22' identical to those previously disclosed. The one change in the diagonal member 22 is the elimination of the wedge and angular element previously shown. In this embodiment, initial and subsequent movement of the support is gained by contact of the abutment 36 by the rear of the camper 12. The abutment 36 must project above the top surface of the member 18, but might also project laterally inward where this is desirable and possible. The operation of the support is identical to that previously described, with the exception that no initial engagement of the member 18' is required, since the engagement by the rear end of the camper 12 with the abutment 36 will provide the necessary rearward motion of the member 18' when the truck 10 is driven to the left, thereby causing the horizontal member 18' to attain the position shown in dashed lines in FIGURE 7. The member 36 will also control the lowering of the member 18' to the full line position shown in FIGURE 7 for transfer of the camper 12 onto the truck body.

In FIGURE 9 is shown a third manner by which the camper 12 can be secured for movement with the longitudinal member 18. In this instance, downwardly protruding lugs 37 are fastened to edge 14 of the chamber 12 and are received within complementary apertures formed within the horizontal member 18. Preferably there should be two such lugs at each side of the camper 12, one mounted adjacent the forward end of the member 18 and the other adjacent the rearward end. In this instance, initial placement of these supports must also include the reception of the lugs 37 within the apertures in the member 18. This form of attachment requires initial modification of the camper structure, but is advisable in certain instances. The lugs 37 can be welded or otherwise secured to the camper 12 at any location sufficiently reinforced and capable of carrying the weight of the camper when taken from the truck 10. Again, in this situation, no wedge is required since the initial contact of the member 18 is assured by the positioning of the lugs 37 within the member 18. The lifting operation and lowering of the camper do require more accurate placement of the supports at the side of the truck 10, and the truck 10 cannot be driven away from the camper 12 without first manually removing the supports from attachment with the permanent lugs 37.

Other equivalent constructions could be utilized in order to insure adequate and proper support of the camper 12 on the two side supporting members. For these reasons, the invention is not to be limited to the physical structures shown in the drawings, except as the device is defined in the following claims.

Having thus described my invention, I claim:

1. A support for one side of a camper unit normally carried at the rear of a truck body, the camper unit having outwardly directed longitudinal ledges formed thereon at each side normally protruding beyond the sides of the truck body, comprising:

a pair of parallel upright members having base portions adapted to rest upon a supporting ground surface;

a horizontal member pivoted respectively at longitudinally spaced locations to the upper ends of said upright members;

and a diagonal member extending from a first pivotal connection to one of said upright members adjacent the upper end of said upright member to a second pivoted connection adjacent the lower end of the remaining one of said upright members, said diagonal member comprising two sections pivoted to one another at a third pivotal connection parallel ton and located intermediate said first and second pivotal connections, the distance between the second pivoted connection of said diagonal member and the third pivotal connection between said sections being such that the lowermost of said sections, when pivoted to a position in contact with the supporting ground surface, maintains said horizontal member at an elevation immediately below that of the ledge of the camper unit to be supported thereon;

and means selectively engageable with the two sections of said diagonal member adapted to lock said sections in aligned positions.

2. A support as defined in claim 1 further comprising: cooperative means on said sections of said diagonal member selectively operable to effect pivotal motion of said sections relative to one another to thereby raise said horizontal member into frictional engagement with the lower surface of the camper unit ledge.

3. A support as defined in claim 1 for camper units having protruding lugs fixed to a ledge of the camper and extending downwardly therefrom and wherein said horizontal member is provided with complementary recesses adapted to receive said lugs.

4. A support for one side of a camper unit normally carried at the rear of a truck body, the camper unit having outwardly directed longitudinal ledges formed thereon at each side normally protruding beyond the sides of the truck body, comprising:

a pair of parallel upright members each having a triangular configuration including an enlarged base adapted to rest upon a supporting ground surface;

a horizontal member pivoted to the upper ends of said upright members about parallel transverse axes spaced apart by a distance equal to the spacing between the bases of said upright members;

and a diagonal member pivotally connected at its ends to said upright members about a pair of axes parallel to the pivotal axes of said horizontal member, the respective pivotal member of said diagonal axes being adjacent opposite ends of said upright members, said diagonal member being comprised of upper and lower rigid sections pivotally connected to one another about a third axis also parallel to the pivotal axes of said horizontal member and located intermediate the first-named axes of said diagonal member, the two sections having portions thereof overlapping one another, the distance between the pivotal axis of the lower section of said diagonal member and the pivotal axis between said upper and lower section being such that the lower section, when pivoted to a position in contact with the supporting ground surface, maintains said horizontal member at an elevation immediately below that of the ledge of the camper unit to be supported thereon;

and releasable means pivotally connected to the two sections of said diagonal member adapted to selectively lock the two sections in an aligned configuration.

5. A support as defined in claim 4 further comprising: cooperative means on said sections of said diagonal member selectively operable to effect pivotal motion of said sections relative to one another to thereby raise said horizontal member into frictional engagement with the lower surface of the camper unit ledge.

6. A support as defined in claim 4 for camper units having protruding lugs fixed to a ledge of the camper and extending downwardly therefrom and wherein said horizontal member is provided with complementary recesses adapted to receive said lugs.

References Cited by the Examiner

UNITED STATES PATENTS

| | | | |
|---|---|---|---|
| 314,438 | 3/85 | Dennis | 182—159 |
| 683,495 | 10/01 | Priestley | 254—49 |
| 906,349 | 12/08 | Wilson | 254—49 |
| 1,000,841 | 8/11 | Pepper et al. | 254—49 |
| 1,284,078 | 11/18 | Evans | 182—152 |
| 2,347,437 | 4/44 | Saxe | 214—515 X |
| 3,089,599 | 5/63 | Casella. | |

FOREIGN PATENTS

| | | |
|---|---|---|
| 1,181,988 | 6/59 | France. |
| 180,860 | 6/22 | Great Britain. |

GERALD M. FORLENZA, *Primary Examiner.*